United States Patent

Endou et al.

[11] 3,867,466
[45] Feb. 18, 1975

[54] ORTHO-METHYLATION OF A PHENOL

[75] Inventors: Akira Endou; Masao Maeda; Toshiharu Okumichi; Teruo Nakayasu; Takao Hamada, all of Osaka, Japan

[73] Assignee: Arakawa Rinsan Kagaku Kogyo Kabushiki Kaisha, Osaka-fu, Japan

[22] Filed: May 28, 1971

[21] Appl. No.: 148,183

[30] Foreign Application Priority Data
June 2, 1970 Japan.............................. 45-48347
July 28, 1970 Japan.............................. 45-66224

[52] U.S. Cl............. 260/621 R, 252/471, 260/620, 260/624 C
[51] Int. Cl............................................ C07c 37/16
[58] Field of Search............ 260/621 R, 624 C, 620; 252/471

[56] References Cited
UNITED STATES PATENTS
3,280,201  10/1966  Hamilton et al............ 260/624 C X
3,347,936  10/1967  Froitzheim et al.............. 260/620 X
3,446,856  5/1969   Hamilton .................... 260/621 R X FOREIGN PATENTS OR APPLICATIONS
1,948,607  6/1970  Germany........................ 260/621 R Primary Examiner—Leon Zitver
Assistant Examiner—Norman P. Morgenstern
Attorney, Agent, or Firm—Mason, Fenwick & Lawrence

[57] ABSTRACT

A process for the ortho-methylation of a phenol of the general formula:

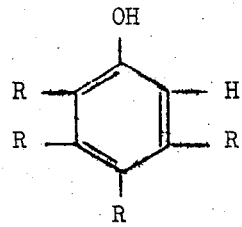

wherein each R stands for hydrogen, an alkyl group of 1 – 12 carbon atoms, phenyl group or a lower alkyl-substituted phenyl group, which comprises reacting methanol with a phenol of the above formula in the vapor phase and in the presence of a calcined mixture of manganese oxide and cerium oxide having a weight ratio of manganese oxide to cerium oxide of 1:0.01 to 1:5.5 as the catalyst.

8 Claims, No Drawings

ORTHO-METHYLATION OF A PHENOL

This invention relates to a process for the ortho-methylation of phenols having at least one ortho-hydrogen atom in the ortho-positions thereof by reacting methanol with such a phenol in the vapor phase in the presence of new binary catalyst systems which have excellent catalytic activity, selectivity and durability of the activity in combination. More particularly, this invention relates to the production of 2,6-xylenol, namely 2,6-dimethyl phenol by the reaction of methanol with phenol and/or ortho-cresol.

From British Pat. No. 717,588 it is known that methanol may be reacted with ortho-cresol in the vapor phase in the presence of a simple catalyst consisting of only one of various metal oxides. In this British patent there are mentioned as the catalytic metal oxides: oxides of magnesium, aluminum, calcium, manganese, iron, zinc, zirconium, barium and thorium etc. Further, U.S. Pat. No. 3,446,856 discloses a process of selectively orthomethylating a phenol having at least one hydrogen in the ortho-positions by reacting methanol with such a phenol at a temperature of 475° to 600°C and in the presence of magnesium oxide alone as the catalyst. Moreover, British Pat. No. 1,124,839 describes a process for the preparation of alkyl-phenols by the vapor-phase reaction of phenol with an alcohol in the presence of an oxide of rare-earth elements such as cerium, lanthanum, neodymium and praseodymium as the catalyst.

However, all the catalysts employed in the above-mentioned processes of the prior art contain only one of various metal oxides as the active component and are not capable of exhibiting a high selectivity for the ortho-methylation and a high durability of the catalytic activity at the same time. Thus, all the known catalysts suffer from one or more drawbacks because they are necessarily poor with respect to one or more of activity, durability of the activity and selectivity.

For instance, the magnesium oxide catalyst has been said most active for the ortho-methylation of phenols having the ortho-hydrogen, but this catalyst requires that the reaction should be carried out at an extremely higher reaction temperature so that its catalytic activity can be reduced markedly in a short period of the reaction, leading to a relatively rapid decrease in the conversion of the phenols.

The known cerium oxide catalyst is not only of very much lower activity but also of poor selectivity for the ortho-methylation of phenols, and besides it suffers from a drawback that it involves a high by-formation of such products which are derived from the simultaneous methylation of the meta- and para-positions of the phenols. Similarly the manganese oxide catalyst is disadvantageous in that it is especially poor in its durability of the catalytic activity, and hence it is not suitable for use in the commercial ortho-methylation of phenols at all. The other known catalysts each consisting of one alone of the oxides of the another metals can show many disadvantages and are not so active as the aforesaid magnesium oxide catalyst.

An object of the present invention is therefore to provide a catalytic process for the ortho-methylation of phenols having at least one hydrogen atom in the ortho-positions in the vapor phase which may be much advantageous to be performed commercially. Another object of the present invention is to provide new and useful catalyst systems which can exhibit better activity, selectivity and durability of the catalytic activity in combination when applied to the ortho-methylation of phenols.

Unexpectedly we have now found that the above objects of the present invention may be achieved entirely when the vapor-phase reaction of methanol with a phenol having at least one ortho-hydrogen carried out using a catalyst system consisting of a calcined mixture of manganese oxide and cerium oxide. This particular catalyst system has combined better activity, selectivity and durability.

According to the present invention, therefore, we provide a process for the ortho-methylation of a phenol represented by the general formula:

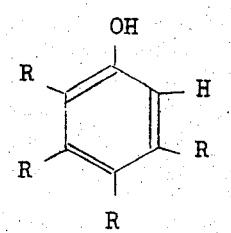

wherein each R stands for hydrogen, an alkyl group of 1 to 12 carbon atoms, phenyl group or a lower alkyl-substituted phenyl group, which comprises reacting methanol with a phenol of the above formula in the vapor phase and in the presence of a calcined mixture of manganese oxide and cerium oxide or of a calcined mixture of manganese oxide and magnesium oxide as the catalyst. Particularly the process of the invention is directed to the ortho-methylation of phenol itself and o-cresol.

The binary catalyst system, namely the calcined manganese oxide-cerium oxide mixture employed according to the process of the present invention are characterized by their remarkably improved durability of the catalytic activity, as compared to the above-mentioned known simple catalysts each consisting of magnesium oxide manganese oxide alone, and they have very much better catalytic activity and selectivity than the known simple catalyst made of cerium oxide alone. Among the catalyst systems of the present invention, the manganese oxide-cerium oxide system is particularly of a great value in its commercial application because its high activity can last over 1,000 hours or more.

When a phenol having two hydrogen atoms in the ortho-positions is methylated according to the process of the present invention, there may be produced the corresponding di-methylated phenol in which both the unsubstituted ortho-positions thereof have been methylated, as well as the corresponding mono-methylated phenol in which only one of the unsubstituted ortho-positions has been methylated, without or substantially without forming any other by-product. Therefore, the process of the present invention is especially suitable and advantageous for effecting the production of ortho-cresol and/or 2,6-xylenol from phenol itself and methanol and for effecting the production of 2,6-xylenol from the ortho-cresol and methanol. By selecting the reaction conditions suitably, the process of the present invention may be controlled to proceed either in such a direction so as to produce the di-methylated phenol predominately or in another direction to produce the mono-methylated phenol predominately. Accordingly it is at choice whether both the unsubtituted ortho-positions or only one of the unsubstituted ortho-positions of the starting phenol is methylated according to the process of the present invention as desired. Thus, the methylation of both the unsubstituted ortho-positions of the starting phenol may be performed by increasing the proportion of charged methanol to the phenol having two ortho-hydrogen atoms, by carrying out the catalytic reaction at a higher temperature or by increasing the contact time between the reactants and the catalyst system or by any other appropriate measure. These operating conditions may be reversed when it is desired to methylate only one of both the unsubstituted ortho-positions of the starting phenol having two ortho-hydrogen atoms. Of course, when the starting phenol used has only one unsubstituted ortho-position such as o-cresol, this single unsubstituted ortho-position can be methylated according to the process of the present invention.

In carrying out the process of the present invention it is possible to employ any conventional type of reactor which has been used for general vapor-phase reactions already known. As an example, the process of the present invention may be carried out in such a manner that a phenol having at least one ortho-hydrogen and methanol are fed separately or in mixture into a pre-heater which is fitted to a reactor containing the catalyst bed therein, these reactants are thus pre-heated and vaporised and the resulting gaseous mixture of the reactants is continuously passed together with an inert gas such as nitrogen into the reactor where the reactants is then brought into contact with the catalyst bed present in the reactor interior with or without external application of heat. The gaseous reaction products so formed are then passed into and condensed in a trap or reservoir which has been cooled down to room temperature or a lower temperature. The condensed reaction products contain higher concentrations of the ortho-methylated products of the phenol and may be purified through known various purification methods such as distillation, recrystallisation, extraction and others if a product of higher purity is desired. The temperature of the pre-heater should be sufficient to vaporise the reactants phenol and methanol completely and is usually at a temperature of 180° – 450°C. Optimum reaction temperature depends on the nature of the ortho-methylation product of phenol to be produced (that is to say, on the difference as to whether only one or both of two ortho-positions of the starting phenol is or are to be methylated) and also depends on the nature and composition of the catalyst system used. In general, however, the reaction may be carried out at a temperature of 300° – 550°C and preferably of 350° – 500°C in the process of the present invention. The reaction pressure for the process of the present invention may be atmospheric, super-atmospheric or sub-atmospheric, but it is advantageous to carry out the reaction at super-atmospheric pressure for example, of up to 20 atm, because a lower reaction temperature may then be employed and decomposition of methanol (into hydroge, carbon dioxide and/or carbon mono-oxide) can be reduced.

The molar ratio of methanol to phenol in the reactant mixture as the feedstock may vary depending on whether the starting phenol contains only one or two ortho-hydrogen atoms in the molecule thereof and also on whether the ortho-methylation product of phenol to be obtained shall contains one or two methyl groups in the ortho-positions. The molar ratio of methanol to phenol containing at least one ortho-hydrogen in the feedstock mixture may suitably be 1 – 10 mol. of methanol per mol. of the phenol, in general. Unreacted reactants may be recovered from the reaction products and recycled to the process for re-use.

The catalyst systems used in the process of the present invention may be prepared using general and well known methods for the preparation of catalysts. For example, the manganese oxide-cerium oxide catalyst system may be prepared by mixing uniformly one or more of the nitrate, carbonate, bi-carbonate, oxalate, acetate, hydroxide and oxide of manganese with one or more of the nitrate, carbonate, bi-carbonate, oxalate acetate, hydroxide and oxide of cerium in the presence of water to give a paste and then calcining this pasty mixture at a temperature of 300° – 600°C for 2 – 10 hours.

The phenol having at least one ortho-hydrogen atom which may be ortho-methylated by the process of the present invention may be represented by the general formula:

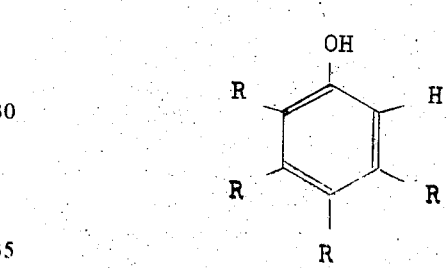

wherein each R stands for hydrogen, and alkyl group of 1 – 12 carbon atoms, preferably an alkyl group of 1 – 8 carbon atoms, especially of 1 – 4 carbon atoms, phenyl group and lower alkyl-substituted phenyl group, particularly methyl-substituted phenyl group. Typical examples thereof include: phenol itself; o-cresol, m-cresol, p-cresol; the various xylenols other than 2,6-xylenol, such as 2,3-xylenol, 2,4-xylenol, 2,5-xylenol, 3,5-xylenol; 2,3,4-trimethyl phenol, 2,3,5-trimethyl phenol, 2,4,5-trimethyl phenol, 3,4,5-trimethyl phenol; 2,3,4,5-tetramethyl phenol; p-tert-butyl phenol; o-phenyl phenol, p-phenyl phenol; 2,3-diphenyl phenol, 2,4-diphenyl phenol; 2-xylyl phenol; 2-mesityl phenol; 2-duryl phenol; 2-methyl-4-phenyl phenol, 2-phenyl-4-methyl phenol, 3-methyl-5-phenyl phenol, etc. Any one or a mixture of two or more of the above phenols may be used as the starting material or reactant for the process of the present invention.

The ortho-methylation products of phenol which are produced by the process of the present invention are useful as a starting material for the synthesis of herbicides, antisepatics and anti-oxidants, etc. In particular, 2,6-xylenol may be used as a starting material for the manufacture of polyether resins such as polyphenylene oxide.

In order to make clearer the characteristics of the present invention, the following examples are given by way of illustration but do not limit the present invention in any way. Many modifications and variation are possible within the scope of the present invention.

EXAMPLE 1

A mixture of phenol itself and methanol at a molar ratio of 1:2 was continuously passed into a preheater heated to 250°C at a velocity (L.H.S.V.) of 0.3 litres per hour per Kg. of the catalyst and the vaporised reactant mixture was then fed to a reactor and brought into contact with the manganese oxide-cerium oxide catalyst system which was charged in said reactor and heated to 400°C, so that the ortho-methylation occurred. This catalyst system consisted of a calcined mixture of manganese oxide and cerium oxide at a ratio of 9:1 by weight. The gaseous reaction products so formed were continuously discharged from the reactor and then collected in a reservoir kept at room temperature. The condensed reaction products were sampled sometimes in the course of the process and analysed. The results obtained are tabulated in Table 1 below.

TABLE 1

| Reaction duration (hour) | 2 | 500 |
|---|---|---|
| Conversion of reactant phenol (%) | 87.0 | 86.7 |
| Analysis of reaction products (nature and content) | | |
| o-Cresol (%) | 65.7 | 63.0 |
| 2,6-Xylenol (%) | 20.2 | 23.7 |
| 2,4,6-Trimethyl phenol (%) | 1.1 | 0 |

EXAMPLE 2

Example 1 was repeated except that the molar ratio of phenol to methanol in the reactant mixture fed was changed to 1:4 and the reaction temperature was slightly increased to 420°C. The results obtained are shown in Table 2.

TABLE 2

| Reaction duration (hour) | 2 | 500 |
|---|---|---|
| Conversion of reactant phenol (%) | 100 | 98.8 |
| Analysis of reaction products (nature and content) | | |
| o-Cresol (%) | 7.2 | 10.0 |
| 2,6-Xylenol (%) | 91.2 | 88.8 |
| 2,4,6-Trimethyl phenol (%) | 1.6 | 0 |

EXAMPLES 3 – 5

The reaction was carried out in a similar way to Example 1 using the reaction conditions and the catalyst systems having the compositions as given in Table 3 below. The results obtained are summerised in Table 3.

TABLE 3

| Example No. | 3 | | 4 | | 5 | | 6 | |
|---|---|---|---|---|---|---|---|---|
| Starting phenol | Phenol | | Phenol | | Phenol | | o-Cresol | |
| Molar ratio of phenol to methanol in reactant mixture fed | 1:4 | | 1:4 | | 1:6.5 | | 1:2 | |
| Pre-heater temperature (°C) | 250 | | 250 | | 250 | | 280 | |
| L.H.S.V. of the reactant mixture (l./hr./Kg. catalyst) | 0.5 | | 0.5 | | 0.5 | | 0.3 | |
| Composition of catalyst system (ratio by weight) | Manganese oxide-cerium oxide (11:1) | | Manganese oxide-magnesium oxide (3:1) | | Manganese oxide-cerium oxide (9:1) | | Manganese oxide-cerium oxide (9:1) | |
| Reaction temperature (°C) | 430 | | 420 | | 420 | | 410 | |
| Reaction duration (hour) | 200 | 500 | 20 | 30 | 500 | 1000 | 2 | 500 |
| Conversion of phenol reactant (%) | 99.3 | 99.3 | 98.5 | 97.0 | 99.5 | 99.1 | 95.1 | 94.9 |
| Analysis of reaction products (nature and content) | | | | | | | | |
| o-Cresol (%) | 16.0 | 16.7 | 14.2 | 46.3 | 8.7 | 9.3 | 1.1 | 3.8 |
| 2,6-Xylenol (%) | 83.3 | 82.6 | 83.1 | 50.1 | 90.8 | 89.8 | 92.8 | 90.8 |
| 2,4,6-Trimethyl phenol (%) | — | — | 1.2 | 0.6 | — | — | 1.2 | 0.3 |

COMPARATIVE EXAMPLES 1 – 3

In order to demonstrate that the catalyst systems used according to the present invention have higher catalytic activity, selectivity and durability than the prior art simple catalysts each consisting of magnesium oxide, cerium oxide or manganese oxide alone, the process of Examples 2 and 3 was carried out in the same manner as mentioned above except that the prior art catalysts were used and the reaction temperature was increased to meet the requirement of the catalysts or to compensate for the lower activity of the old catalysts. The results obtained are tabulated in Table 4 below.

From the results of Table 4, it may be seen that the old catalysts can show a substantial reduction in the conversion of the reactant phenol and hence in the catalytic activity already in a reaction duration of 20 hours and that they also can lead to a large decrease in the yield of 2,6-xylenol. In contrast to this, the results of Table 3 reveal that the catalyst systems according to

TABLE 4

| Comparative Example No. | 1 | | 2 | | 3 | |
|---|---|---|---|---|---|---|
| Starting phenol | Phenol itself | | Phenol itself | | Phenol itself | |
| Molar ratio of phenol to methanol in reactant mixture fed | 1:4 | | 1:4 | | 1:4 | |
| Pre-heater temperature (°C) | 250 | | 250 | | 250 | |
| L.H.S.V. of the reactant mixture (l./hr./kg. catalyst) | 0.5 | | 0.5 | | 0.5 | |
| Composition of catalyst | Magnesium oxide alone | | Cerium oxide alone | | Manganese oxide alone | |
| Reaction temperature (°C) | 500 | | 460 | | 440 | |
| Reaction duration (hour) | 5 | 20 | 5 | 20 | 2 | 20 |
| Conversion of reactant phenol (%) | 99.4 | 94.0 | 43.0 | 39.5 | 100 | 22.4 |
| Analysis of reaction products (nature and content) | | | | | | |
| o-Cresol (%) | 1.2 | 30.7 | 40.1 | 38.5 | 11.8 | 3.7 |
| 2,6-Xylenol (%) | 91.1 | 62.3 | 2.9 | 1.0 | 88.2 | 18.7 |
| 2,4,6-Trimethyl phenol (%) | 7.1 | 1.0 | — | — | — | — | the present invention, particularly the manganese oxide-cerium oxide catalyst system can keep higher conversion of the phenol and hence can last higher catalytic activity substantially at the same level over a longer period of up to 1,000 hours and that the manganese oxide-cerium oxide catalyst system can simultaneously maintain the higher yield of 2,6-xylenol substantially at the constant level over a longer period of up to 1,000 hours, thus showing the combination of higher catalytic activity, better durability of the catalytic activity and more lasting selectivity.

EXAMPLES 7–8 AND COMPARATIVE EXAMPLE 4

A further series of tests was carried out as Examples 7 and 8 in a similar way to Example 1 using the other starting phenols, the reaction conditions and catalyst systems of the compositions as indicated in Table 5 below. For comparison, a prior art catalyst made of magnesium oxide alone was used for the reaction in the same manner except that the reaction temperature was increased. Results of the tests ae summarised in the following table.

TABLE 5

| Test No. | Example 7 | | Example 8 | | Comparative Example 4 | |
|---|---|---|---|---|---|---|
| Starting phenol | m-Cresol | | p-Cresol | | p-Cresol | |
| Molar ratio of starting phenol to methanol | 1:4 | | 1:6.5 | | 1:6.5 | |
| Pre-heater temperature (°C) | 300 | | 300 | | 300 | |
| L.H.S.V. of the reaction mixture fed (l./hr./kg. catalyst) | 0.55 | | 0.55 | | 0.55 | |
| Composition of catalyst system (ratio by weight) | Manganese oxide-cerium oxide (9:1) | | Manganese oxide-magnesium oxide (3:1) | | Magnesium oxide alone | |
| Reaction temperature (°C.) | 400 | | 440 | | 500 | |
| Reaction duration (hour) | 200 | 500 | 5 | 50 | 5 | 20 |
| Conversion of starting phenol (%) | 99.4 | 99.3 | 99.1 | 89.3 | 99.0 | 78.4 |
| Analysis of reaction products (nature and content) | | | | | | |
| 2,3-Dimethyl phenol (%) | 2.5 | 1.7 | — | — | — | — |
| 2,4-Dimethyl phenol (%) | — | — | 4.1 | 3.7 | 5.2 | 36.8 |
| 2,5-Dimethyl phenol (%) | 7.3 | 7.5 | — | — | — | — |
| 2,3,6-Trimethyl phenol (%) | 89.6 | 90.1 | — | — | — | — |
| 2,4,6-Trimethyl phenol (%) | — | — | 95.0 | 85.6 | 93.8 | 41.6 |

EXAMPLES 9 – 10

Another series of tests were carried out as Examples 9 and 10 using the other starting alkyl-substituted phenols, the reaction conditions and the catalyst systems as specified in Table 6 below. The results obtained are shown in the following table.

TABLE 6

| Example No. | 9 | | 10 | |
|---|---|---|---|---|
| Starting phenol | p-tert-Butyl phenol | | 3,5-Xylenol | |
| Molar ratio of phenol to methanol in reactant mixture fed | 1:4 | | 1:4 | |
| Pre-heater temperature (°C) | 300 | | 300 | |
| L.H.S.V. of reactant mixture (l./hr./kg. catalyst) | 0.55 | | 0.55 | |
| Composition of catalyst system (ratio by weight) | Manganese oxide-cerium oxide (11:1) | | Manganese oxide-cerium oxide (9:1) | |
| Reaction temperature (°C) | 400 | | 400 | |
| Reaction duration (hour) | 200 | 500 | 200 | 500 |
| Conversion of starting phenol(%) | 98.4 | 96.8 | 99.8 | 99.3 |
| Analysis of reaction products (nature and content) | | | | |
| 2-Methyl-4-tert-butyl phenol (%) | 5.2 | 8.4 | — | — |
| 2,6-Dimethyl-4-tert-butyl phenol(%) | 93.2 | 88.4 | — | — |
| 2,3,5-Trimethyl phenol(%) | — | — | 2.1 | 3.0 |
| 2,3,5,6-Tetramethyl phenol(%) | — | — | 97.7 | 96.3 |

What we claim is:

1. A process for the ortho-methylation of a phenol of the general formula:

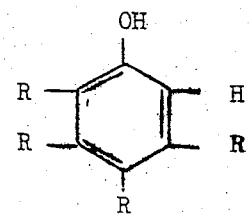

wherein each R stands for hydrogen, an alkyl group of 1–12 carbon atoms, phenyl group or a lower alkyl-substituted phenyl group, which comprises reacting methanol with a phenol of the above formula in the vapor phase and in the presence of a calcined mixture consisting essentially of manganese oxide and cerium oxide having a weight ratio of manganese oxide to cerium oxide in the range 1:0.01 to 1:0.5. as the catalyst.

2. A process as claimed in claim 1 in which the reactant phenol is mixed with methanol and the reactant mixture is passed to a pre-heater heated to a temperature of 180° – 450°C., prior to its feed into the reactor.

3. A process as claimed in claim 1 in which the reactant mixture contains methanol and phenol at a proportion of 1 – 10 mol. per mol. of the starting phenol.

4. A process as claimed in claim 1 in which the ortho-methylation is carried out at a temperature of 300° – 550°C., preferably of 350° – 500°C.

5. A process as claimed in claim 1 in which the catalyst system used has been prepared by mixing uniformly one or more of the nitrate, carbonate, bicarbonate, oxalate, acetate, hydroxide and oxide of manganese with one or more of the nitrate, carbonate, bicarbonate, oxalate, acetate, hydroxide and oxide of cerium together with water added to give an aqueous paste and then calcining this pasty mixture at a temperature of 300° – 600°C. for 2 – 10 hours.

6. A process as claimed in claim 1 in which phenol itself is ortho-methylated into 2,6-xylenol.

7. A process as claimed in claim 1 in which o-cresol is ortho-methylated into 2,6-xylenol.

8. A process as claimed in claim 1 in which a phenol other than phenol itself and o-cresol is ortho-methylated.

* * * * *